(12) United States Patent
Lee

(10) Patent No.: US 8,734,974 B2
(45) Date of Patent: May 27, 2014

(54) RECHARGEABLE BATTERY

(75) Inventor: Chi-Young Lee, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 18 days.

(21) Appl. No.: 13/267,391

(22) Filed: Oct. 6, 2011

(65) Prior Publication Data

US 2012/0135283 A1 May 31, 2012

(30) Foreign Application Priority Data

Nov. 25, 2010 (KR) ........................ 10-2010-0118340

(51) Int. Cl.
  *H01M 2/30* (2006.01)
  *H01M 2/04* (2006.01)
  *H01M 2/12* (2006.01)

(52) U.S. Cl.
  USPC .............. 429/82; 429/176; 429/177; 429/178

(58) Field of Classification Search
  USPC ........................................... 429/82, 176–178
  See application file for complete search history.

(56) References Cited

U.S. PATENT DOCUMENTS

| 7,718,312 | B2 * | 5/2010 | Tasai et al. | 429/211 |
| 7,736,797 | B2 | 6/2010 | Kim et al. | |
| 2006/0024578 | A1 * | 2/2006 | Lee | 429/208 |
| 2006/0051664 | A1 | 3/2006 | Tasai et al. | |
| 2006/0057459 | A1 * | 3/2006 | Kwon et al. | 429/174 |
| 2006/0115722 | A1 | 6/2006 | Kim | |
| 2006/0275658 | A1 | 12/2006 | Sanada et al. | |
| 2007/0105015 | A1 * | 5/2007 | Munenaga et al. | 429/161 |
| 2010/0247989 | A1 | 9/2010 | Kim | |
| 2011/0250491 | A1 * | 10/2011 | Kim et al. | 429/176 |

FOREIGN PATENT DOCUMENTS

| EP | 2375475 A1 | 10/2011 | |
| JP | 2004-111300 A | 8/2004 | |
| JP | 2005-142026 A | 6/2005 | |
| JP | 2006-196222 A | 7/2006 | |
| JP | 2006-339031 A | 12/2006 | |
| KR | 1020050049835 | * 5/2005 | H01M 2/04 |
| KR | 10-0627296 B1 | 9/2006 | |
| KR | 10-0637443 B1 | 10/2006 | |
| KR | 10-2010-0108854 A | 10/2010 | |

OTHER PUBLICATIONS

Machine English Translation of KR 1020050049835 to Hong.*
Office Action issued in corresponding Korean application, 10-2010-0118340, dated Sep. 8, 2011.
European Search Report in EP 11188058.9-1227, dated Feb. 23, 2012 (Lee).
Korean Notice of Allowance in KR 10-2010-0118340, dated Apr. 23, 2012 (Lee).

* cited by examiner

*Primary Examiner* — Milton I Cano
*Assistant Examiner* — Michael Dignan
(74) *Attorney, Agent, or Firm* — Lee & Morse, P.C.

(57) ABSTRACT

A rechargeable battery including at least one electrode assembly that performs charging and discharging; a case receiving the electrode assembly; a cap assembly coupled to the case and including at least one terminal electrically connected to the electrode assembly; a lead tab electrically connecting the terminal and the electrode assembly; and a supporting member between the lead tab and the case, wherein the lead tab includes at least one coupling bar attached to the electrode assembly, and the supporting member includes a supporting protrusion coupled to one surface of the coupling bar and a base supported by an inner surface of the case.

17 Claims, 17 Drawing Sheets

RECHARGEABLE BATTERY

Korean Patent Application No. 10-2010-0118340, filed on Nov. 25, 2010, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

Unlike a primary battery that cannot be recharged, a rechargeable battery (i.e., a secondary battery or a secondary cell) may be repeatedly charged and discharged. A low-capacity rechargeable battery may be used for small portable electronic devices, e.g., mobile phones, notebook computers, camcorders, and the like. A large-capacity battery may be used as a power source for, e.g., driving a motor of a hybrid electric vehicle and the like.

A high-power rechargeable battery using a non-aqueous electrolyte with high energy density has recently been developed. For example, the high-power rechargeable battery may be constructed as a high-capacity rechargeable battery having a plurality of rechargeable cells coupled to each other in series such that it may be used as a power supply for driving motors in electric vehicles requiring high power.

A prismatic-shaped rechargeable battery may include an electrode assembly (including a positive electrode and a negative electrode with a separator interposed therebetween), a case (having a space for accommodating the electrode assembly), and a cap plate that seals the case and has a terminal inserted therein. The terminal may be electrically connected with the electrode assembly and may protrude outside of the case. The terminal may be electrically connected to the electrode assembly via the lead tab; and the lead tab may be fixed to the terminal and the electrode assembly.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including at least one electrode assembly that performs charging and discharging; a case receiving the electrode assembly; a cap assembly coupled to the case and including at least one terminal electrically connected to the electrode assembly; a lead tab electrically connecting the terminal and the electrode assembly; and a supporting member between the lead tab and the case, wherein the lead tab includes at least one coupling bar attached to the electrode assembly, and the supporting member includes a supporting protrusion coupled to one surface of the coupling bar and a base supported by an inner surface of the case.

The supporting member may further include a supporting jaw, the supporting jaw extending around one surface of the coupling bar.

The rechargeable battery may include a plurality of electrode assemblies, the lead tab may include a plurality of coupling bars attached to each electrode assembly, the supporting member may include a plurality of supporting protrusions, and the supporting jaw may protrude from the supporting protrusion.

The supporting member may include a side end supporting plate protruding from side ends of the base, and the side end supporting plate may support an uncoated region of the electrode assembly and the inner surface of the case.

The side end supporting plate may include a supporting jaw at an end thereof, the supporting jaw extending around one surface of the coupling bar.

The coupling bar may include a protruding hook portion.

The hook portion may be bent to protrude obliquely.

The coupling bar may include an insertion tip under the hook portion, the coupling bar being separated from an uncoated region of the electrode assembly.

The supporting protrusion may be positioned on the hook portion.

The supporting protrusion may include an upper supporting protrusion and a lower supporting protrusion vertically separated from the upper supporting protrusion, and the hook portion may be positioned between the upper supporting protrusion and the lower supporting protrusion.

The supporting protrusions may include a supporting jaw protruding laterally at a side thereof, the supporting jaw extending around one surface of the coupling bar, and the supporting jaw of the upper supporting protrusion and the supporting jaw of the lower supporting protrusion may protrude in different lateral directions.

The upper supporting protrusion and the lower supporting protrusion may contact opposite surfaces of the coupling bar.

The supporting member may further include a supporting jaw enclosing the coupling bar.

The coupling bar may include a protruding hook portion, the supporting jaw may be under the supporting protrusion, and the hook portion may be between the supporting protrusion and the supporting jaw.

The rechargeable battery may include a plurality of electrode assembles, the lead tab may include a plurality of coupling bars attached to the electrode assembles, and the supporting jaw may enclose the plurality of coupling bars and may include opposing plates and a connecting plate fixed to an end of the opposing plates.

Each coupling bar may include a welding portion coupled to the electrode assembly by welding, a hook portion obliquely bent toward a neighboring coupling bar at the welding portion, and an insertion tip bent from the hook portion and extending toward a bottom of the case, the supporting protrusion may be inserted between neighboring welding portions, and at least one of the opposing plates may be inserted between the insertion tip and an uncoated region of the electrode assemblies.

The rechargeable battery may include a plurality of electrode assemblies, and the base may include a protrusion unit that is bent and is inserted between uncoated regions of the electrode assemblies.

The base may include a hole to discharge gas inside the electrode assembly.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
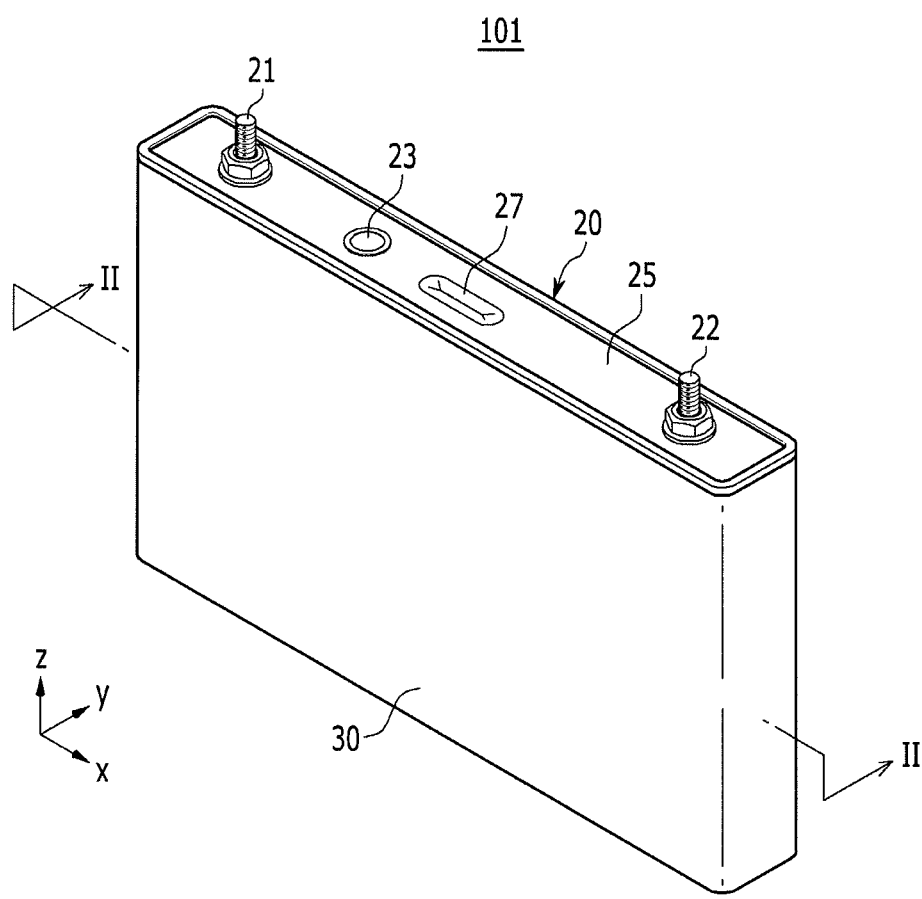
FIG. 1 illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
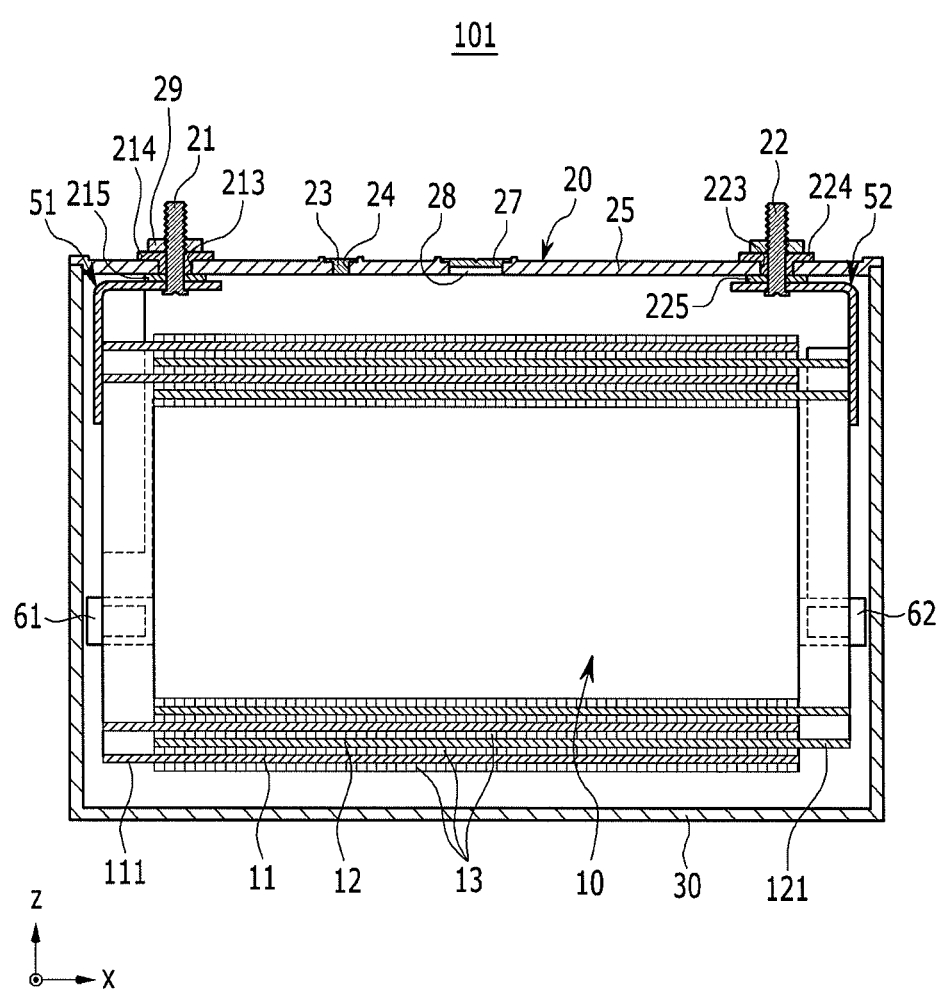
FIG. 2 illustrates a cross-sectional view taken along a line II-II of FIG. 1 in an X-Z plane.

FIG. 1 illustrates a perspective view of a rechargeable battery according to an embodiment. FIG. 2 illustrates a cross-sectional view taken along a line II-II of FIG. 1 in an X-Z plane.

Referring to FIG. 1 and FIG. 2, a rechargeable battery 101 according to the present embodiment may include an electrode assembly 10 (in which a positive electrode 11 and a negative electrode 12 are wound with an insulating separator 13 therebetween), a case 30 accommodating the electrode assembly 10 therein, and a cap assembly 20 coupled to an opening at one side of the case 30.

The rechargeable battery 101 according to the present embodiment may be a lithium ion rechargeable battery and may have an angular or prismatic shape, and such a rechargeable battery will be described as an example. However, the embodiments are not limited thereto; and the embodiments may be applied to other types of batteries, e.g., a lithium polymer battery, a cylindrical battery, and the like.

The positive electrode 11 and the negative electrode 12 may include a current collector made of a thin metal foil and an active material on each current collector. Also, the positive electrode 11 and the negative electrode 12 may include a coated region (where the active material layer is formed on the current collector) and uncoated regions 111 and 121 (where the active material layer is not formed on the current collector).

The positive electrode uncoated region 111 may be formed at one side end of the positive electrode 11 (relative to a length direction of the positive electrode 11); and the negative electrode uncoated region 121 may be formed at another side end of the negative electrode 12 (relative to a length direction of the negative electrode 12). As described above, the positive electrode 11 and the negative electrode 12 may be wound with the insulating separator 13 interposed therebetween.

However, the embodiments are not limited thereto; and the electrode assembly 10 may have a structure, e.g., in which the positive electrode and the negative electrode that are formed as a plurality of sheets are stacked with the separator interposed therebetween.

Figure 3:
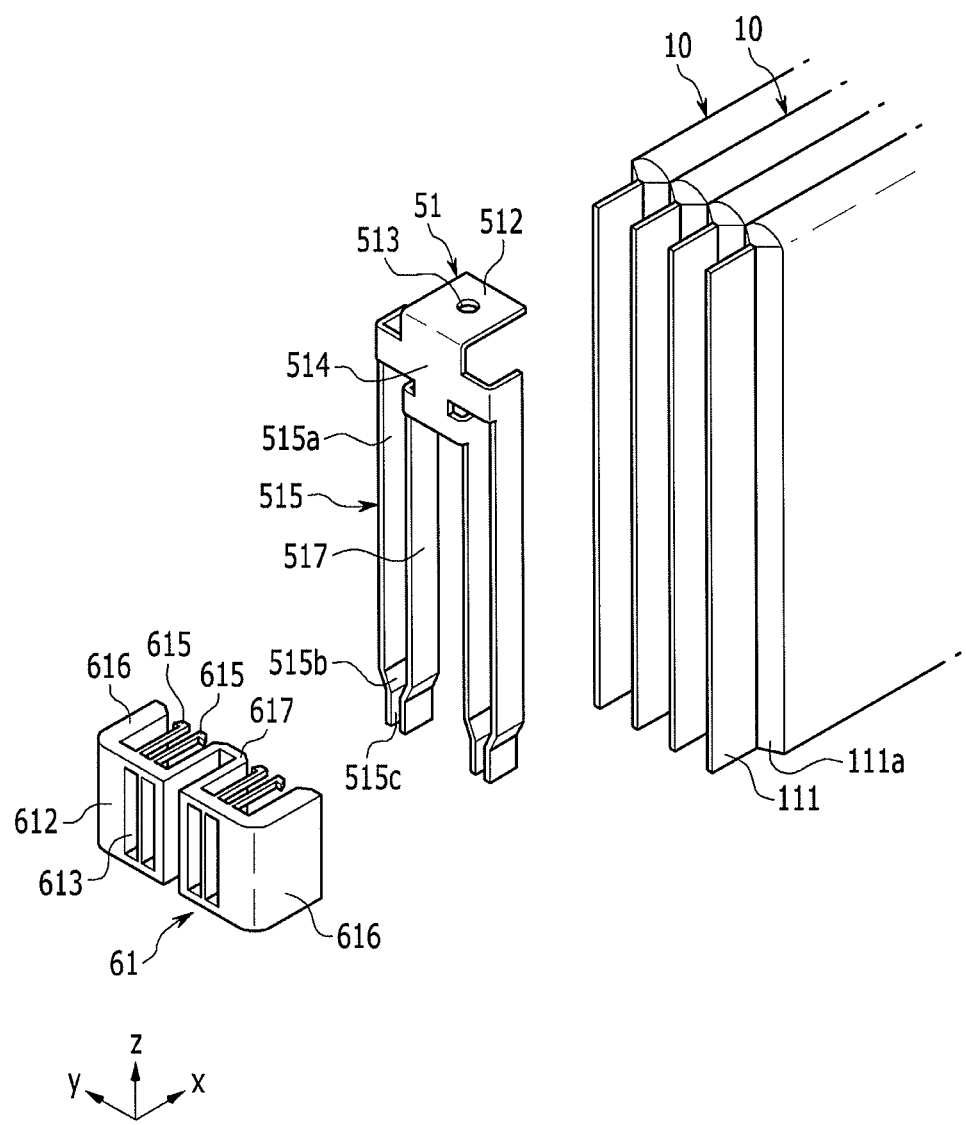
FIG. 3 illustrates an exploded perspective view of a supporting member, a lead tab, and an electrode assembly of the rechargeable battery of FIG. 1.

FIG. 3 illustrates an exploded perspective view of a supporting member, a lead tab, and an electrode assembly of the rechargeable battery of FIG. 1. As shown in FIG. 3, a plurality of electrode assemblies 10 may be inserted and installed in the case 30. For example, the rechargeable battery 101 according to the present embodiment may include four electrode assemblies 10. The electrode assembly 10 may have an approximate plate-like shape by being pressed after being wound; and a plurality of electrode assemblies 10 may be erected and disposed such that the uncoated regions 111 and 121 may be positioned at a side end inside the case 30.

The case 30 may form an entire exterior of the rechargeable battery 10. The case 30 may be made of a conductive metal, e.g., aluminum, an aluminum alloy, or nickel-plated steel. The case 30 may include a space therein for accommodating the electrode assembly 10. For example, the case 30 may have a rectangular parallelepiped angular shape having an opening at one end thereof to accommodate the electrode assembly 10 having a shape corresponding to the rectangular parallelepiped. In an implementation, the opening may face an upper direction in the case 30, as shown in FIG. 1 and FIG. 2.

The cap assembly 20 may include a cap plate 25 covering the opening of the case 30, a positive electrode terminal 21 protruding outside the cap plate 25 (and electrically connected to the positive electrode 11), and a negative electrode terminal 22 (electrically connected to the negative electrode 12).

The cap plate 25 may be formed of a thin plate material and may be coupled to the opening of the case 30. A sealing cap 23 may be installed in an electrolyte solution inlet 24 in the cap plate 25; and a vent plate 27 (having a notch 39a that is openable at a predetermined pressure) may be installed at a vent hole 28.

The positive electrode terminal 21 and the negative electrode terminal 22 may penetrate the cap plate 25 and may include flanges 21a and 22a in lower portions thereof and supported on a bottom of the cap plate 25. Outer circumferential surfaces of upper columns of the positive electrode terminal 21 and the negative electrode terminal 22 protruding outside the cap plate 25 may be threaded; and nuts 29 may be fastened to the terminals 21 and 22 and may support the upper portions of the terminals 21 and 22.

In the present embodiment, the terminals 21 and 22 may be fixed by the nuts 29, but the embodiments are not limited thereto. For example, the terminals 21 and 22 may have a rivet structure or may be fixed through welding.

The positive electrode terminal 21 may be electrically connected to the positive electrode uncoated region 111 by a lead tab 51. The negative electrode terminal 22 may be electrically connected to the negative electrode uncoated region 121 by a lead tab 52. The lead tabs 51 and 52 may be welded and fixed to the terminal flanges 21a and 22a. However, the embodiments are not limited thereto; and the electrode terminals 21 and 22 and the lead tabs 51 and 52 may be integrally formed.

A terminal hole 213 (in which the positive electrode terminal 21 may be inserted) may be formed at the cap plate 25. An outer gasket 214 and an inner gasket 215 may be installed at the terminal hole 213 for insulation and sealing. The outer gasket 214 may be partially inserted into the terminal hole 213 outside the cap plate 25 and may insulate the positive electrode terminal 21 and the cap plate 25 from each other. The inner gasket 215 (corresponding to an inside of the terminal hole 213) may insulate the cap plate 25 and the lead tab 51 inside the cap plate 25.

The cap plate 25 may have a terminal hole 223 (in which the negative electrode terminal 22 may be inserted); and an outer gasket 224 and an inner gasket 225 may be installed at the terminal hole 223 for insulation and sealing. The outer gasket 224 may be partially inserted into the terminal hole 223 outside the cap plate 25 to electrically insulate the negative electrode terminal 22 and the cap plate 25 from each other. The inner gasket 225 (corresponding to an inside of the terminal hole 223) may be included inside the cap plate 25 to electrically insulate the cap plate 25 and the lead tab 52 from each other.

Figure 4:
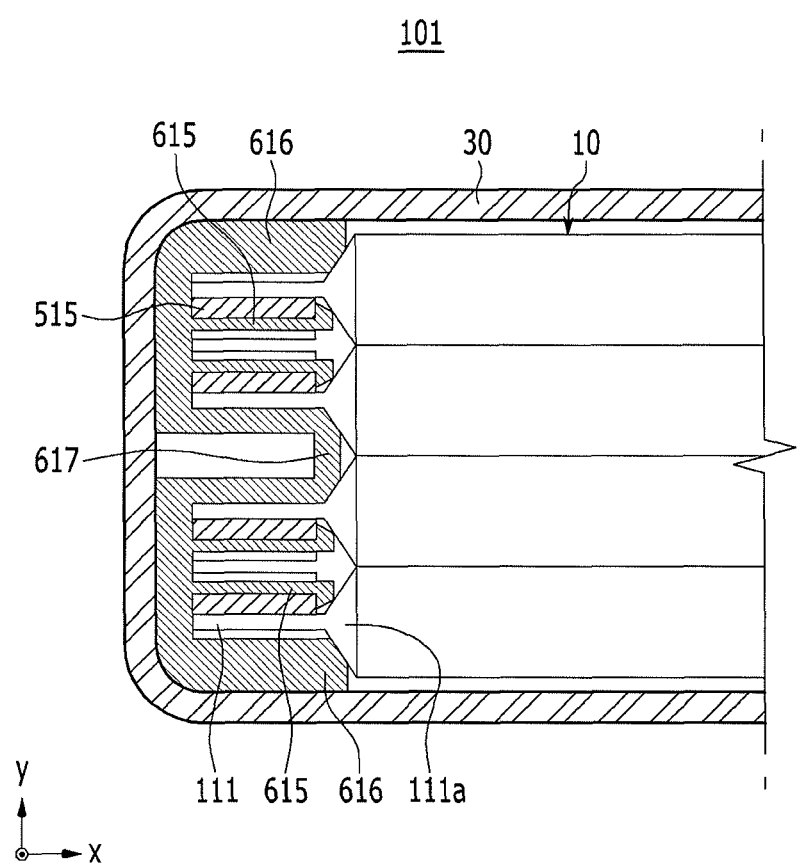
FIG. 4 illustrates a cross-sectional view of a portion of the rechargeable battery of FIG. 1, taken along an X-Y plane.

As described above, FIG. 3 illustrates an exploded perspective view of a supporting member, a lead tab, and an electrode assembly of the rechargeable battery of FIG. 1. FIG. 4 illustrates a cross-sectional view of a portion of the rechargeable battery of FIG. 1, taken along an X-Y plane.

Referring to FIG. 3 and FIG. 4, the lead tab and the supporting member will be described.

The lead tab 52 and a supporting member 62 corresponding to the negative electrode terminal 22 may have the same structure as the lead tab 51 and a supporting member 61 corresponding to the positive electrode terminal 21. Thus, a description of the lead tab 51 and the supporting member 61 connected to the positive electrode terminal 21 is the same description as the lead tab 52 and the supporting member 62 connected to the negative electrode terminal 22.

The lead tab 51 may include a connecting unit 512 (having a hole 513 into which the positive electrode terminal 21 may be inserted), a side plate 514 under the connecting unit 512 (and between a side section of the electrode assembly 10 and the case 30), and a coupling bar 515 under the side plate 514 (and attached to the positive electrode uncoated region 111 of the electrode assembly 10). In a state in which four coupling bars 515 are bent at the side plate 514 and disposed parallel to the positive electrode uncoated region 111, the four coupling bars 515 may be coupled to the positive electrode uncoated region 111 of the electrode assembly 10 through, e.g., welding.

Two coupling bars 515 may be inserted between facing positive electrode uncoated regions 111; and a coupling bar 515 may be coupled with a facing surface of the positive electrode uncoated regions 111 by, e.g., welding. Each coupling bar 515 may have the same structure. For example, each coupling bar 515 may include a welding portion 515a (bent at a side end and coupled to the positive electrode uncoated region 111 through welding), a hook portion 515b (protruding away from portions of the positive electrode uncoated region 111 of the electrode assembly 10 to which the welding portion 515a is attached), and an insertion tip 515c (bent at an end portion of the hook portion 515b and formed parallel to the welding portion 515a).

In an implementation, the hook portion 515b may protrude obliquely, e.g., at an angle of about 5° to less than about 90° with respect to the welding portion 515a, toward an adjacent coupling bar 515. In the present embodiment, the hook portion 515b may be bent, however the embodiments are not limited thereto; and the hook portion 515b may be made of various structures that protrude from the welding portion 515a, such as a protrusion shape.

The insertion tip 515c may be bent at an end of the hook portion 515b and may extend toward a bottom of the case 30. In an implementation, the insertion tip 515c may be separated from the positive electrode uncoated region 111. Accordingly, an interval between two facing insertion tips 515c may be smaller than an interval between corresponding facing welding portions 515a. Thus, the insertion tip 515c may be positioned at a more inner side than a boundary between the electrode assemblies 10 and the facing insertion tips 515c may not contact one another.

As described above, the bent portion may be at ends of the hook portion 515b. Thus, the hook portion 515b may be referred to as a non-continuous portion. The non-continuous portion as a portion that is protruded or bent such that one plane is completed means a portion at which the outer surface is bent. Accordingly, in the present embodiment, the hook portion 515b may be formed such that ends of the coupling bars 515 are separated from each other at the electrode assembly 10. Thus, the lead tab 51 may be easily inserted between the electrode assemblies 10.

The supporting member 61 may be positioned between the lead tab 51 and the inner surface of the case 30. Thus, the supporting member 61 may support the lead tab 51 and the electrode assembly 10 to prevent movement and deformation thereof.

Figure 5:
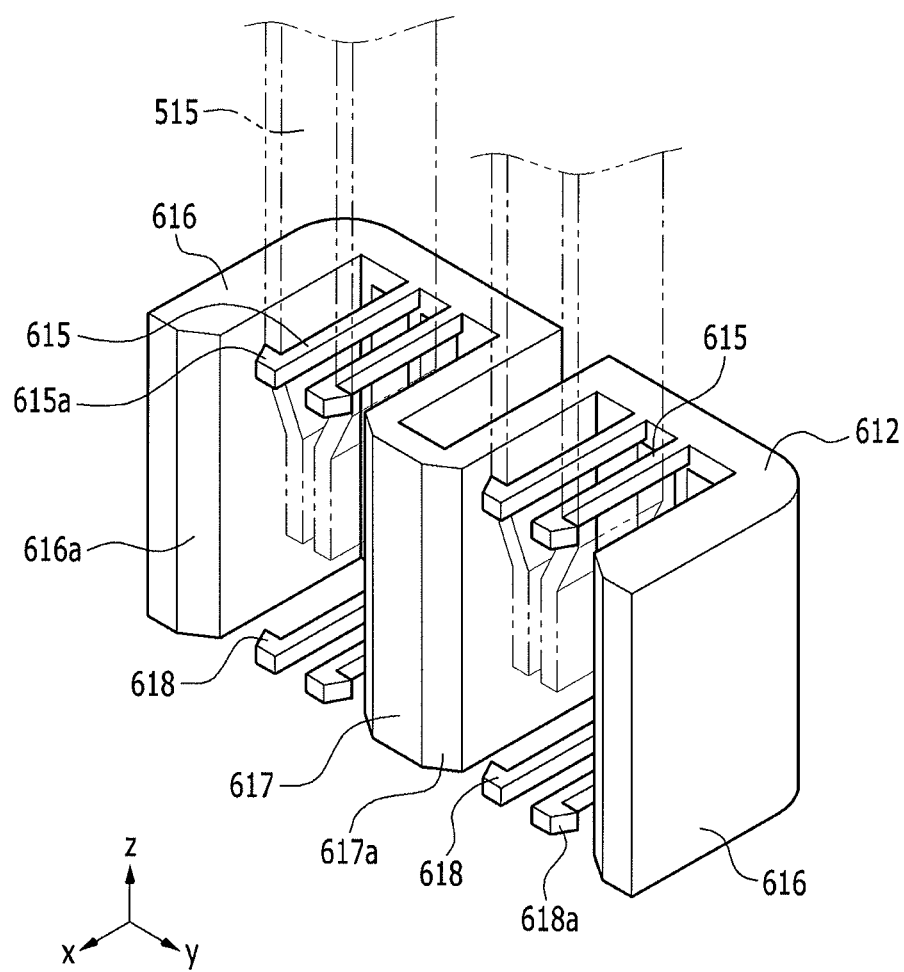
FIG. 5 illustrates a perspective view of the supporting member of the rechargeable battery of FIG. 1.

FIG. 5 illustrates a perspective view of a fixing member of the rechargeable battery of FIG. 1. As shown in FIG. 5, the supporting member 61 may include a plate-shaped base 612, supporting protrusions 615 and 618 protruding from the base 612 toward the electrode assembly 10, and a side end supporting plate 616 protruding from side ends of the base 612.

The base 612 may have a plate shape that is continuous in a deposition direction of the electrode assembly 10. A protrusion unit 617 (bent or protruding toward the electrode assembly 10) may be formed at a center of the base 612. In an implementation, the base 612 may include a hole 613 (referring to FIG. 3) to discharge gas from inside of the electrode assembly 10.

As described above, the positive electrode uncoated region 111 may not include the active material layer and thus may be thinner than the coating portion (on which the active material layer is formed). Accordingly, the rolled and deposited positive electrode uncoated region 111 may be closely adhered to itself; and an inclined portion 111a (referring to FIG. 3) may be formed at a portion of the positive electrode uncoated region 111 connected to the coating portion.

The side end supporting plate 616 and the protrusion unit 617 may include inclined surfaces 616a and 617a in contact with the inclined portion 111a. Thus, the side end supporting plate 616 and the protrusion unit 617 may stably support the electrode assembly 10 and the lead tab 51 at the inclined portion 111a.

The supporting protrusions 615 and 618 may have a bar shape that protrudes toward the electrode assembly 10. The supporting protrusions 615 and 618 may be coupled to the coupling bar 515. The supporting protrusions 615 and 618 may include supporting jaws 615a and 618a at ends thereof that protrude laterally therefrom. The supporting protrusion 615 may protrude from an upper side of the base 612; and the supporting protrusion 618 may protrude from a lower side of the base 612. The supporting jaws 615a and 618a may include an inclined surface such that they may contact with and may support the inclined portion 111a of the positive electrode uncoated region 111.

In an implementation, four supporting protrusions 615 may be formed at the upper portion of the base 612 and four supporting protrusions 618 may be formed at the lower portion of the base 612. In addition, two of each supporting protrusions 615 and 618 may be positioned at the upper and lower portions of the base 612 at one side of the protrusion unit 617; and two of each supporting protrusions 615 and 618 may be inserted between the coupling bars 515. The upper supporting protrusion 615 may be close to the welding portion 515a such that the supporting jaw 615a may be caught in the width direction end of or extend around the welding portion 515a, e.g., the supporting jaw 615a may grip the welding portion 515a. For example, one end (relative to the width direction) of the coupling bar 515 may contact the base 612 and another end of the coupling bar 515 may contact the supporting jaw 615a such that the supporting member 61 may stably support the lead tab 51.

The upper supporting protrusion 615 may be caught by or extend around the hook portion 512b of the lead tab 51 to downwardly support the lead tab 51. An upper portion of the lead tab 51 may be fixed to the positive electrode terminal 21 and thus may be relatively strong against or resistant to an impact. However, a lower portion of the lead tab 51 may be free, thus being relatively weak against or sensitive to an impact. Accordingly, by installing the supporting member 61 under the lead tab 51, the lead tab 51 may be further stably supported.

As described above, according to the present embodiment, the base 612 may be supported by the inner surface of the case 30; and the protrusion unit 617, the supporting protrusions 615 and 618, and the side end supporting plate 616 may support the inclined portion 111a. Thus, the lead tab 51 and the electrode assemblies 10 may be further stably supported. For example, the supporting jaws 615a and 618a may be formed such that movement of the lead tab 51 inside the rechargeable battery 101 may be prevented. Accordingly, a single supporting member 61 may support both the lead tab 51 and the electrode assembly 10. In addition, according to the present embodiment, two supporting members 61 and 62 may be installed at side ends of the electrode assembly 10 such that movement of the electrode assembly 10 in a side direction in the case 30 may be prevented.

Figure 17A:
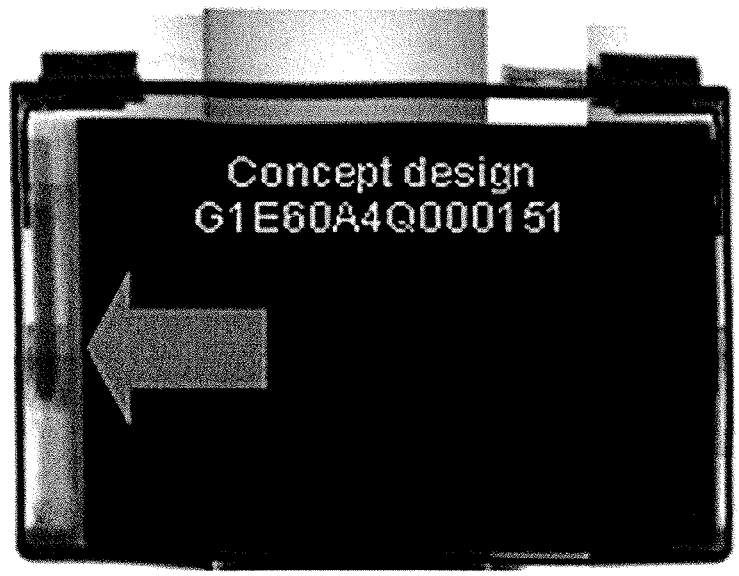
FIG. 17A illustrates an image showing deformation of a lead tab when applying an impact to the rechargeable battery of FIG. 1.
Figure 17B:
FIG. 17B illustrates an image showing deformation of a lead tab when applying an impact to a typical rechargeable battery.

FIG. 17A illustrates an image showing deformation of a lead tab when applying an impact to the rechargeable battery of FIG. 1. FIG. 17B illustrates an image showing deformation of a lead tab when applying an impact to a conventional rechargeable battery. As shown in FIG. 17A and FIG. 17B, when the supporting member 61 of an embodiment is not provided, the lead tab may be seriously transformed or moved in an inner direction of the case 30; and a position of the electrode assembly 10 may be changed. However, in the present embodiment, the lead tab may be only rarely or minimally transformed or moved.

Figure 6:
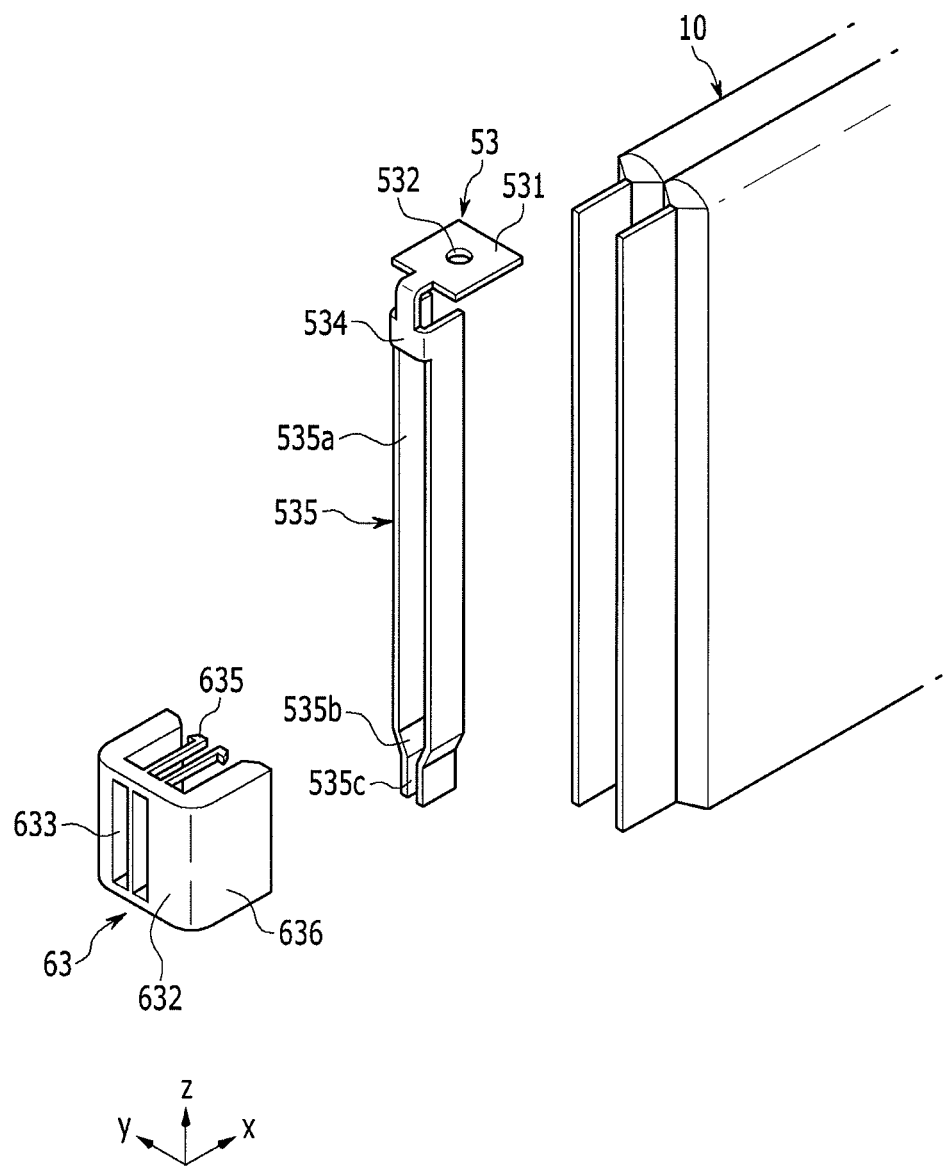
FIG. 6 illustrates an exploded perspective view of a supporting member, a lead tab, and an electrode assembly of a rechargeable battery according to another embodiment.
Figure 7:
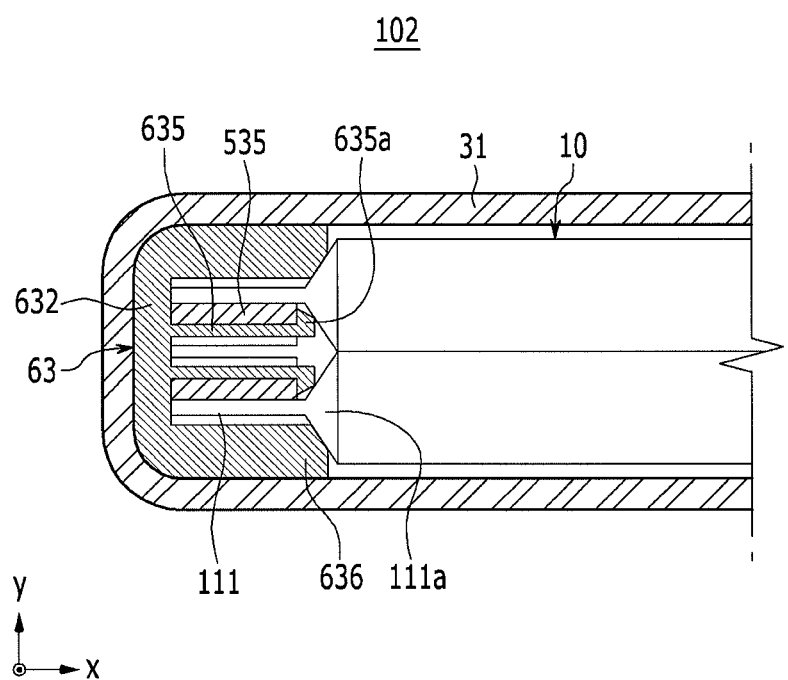
FIG. 7 illustrates a cross-sectional view of a portion of the rechargeable battery of FIG. 6, taken along an X-Y plane.
Figure 8:
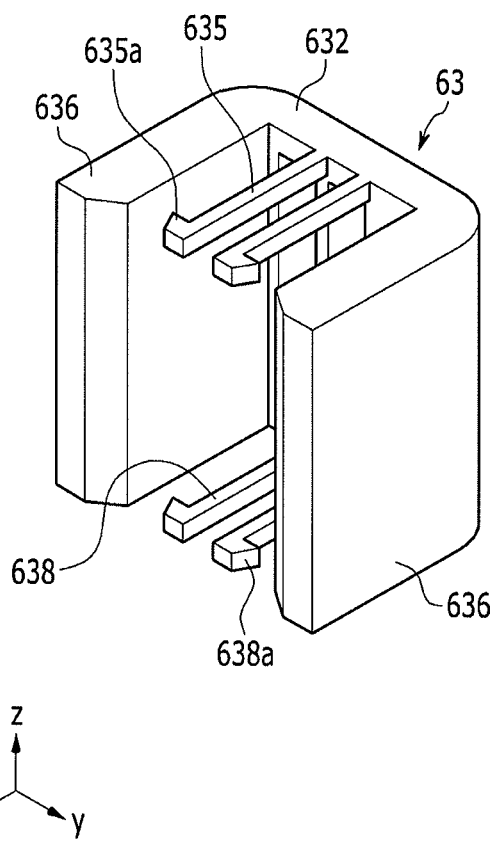
FIG. 8 illustrates a perspective view of the supporting member of the rechargeable battery of FIG. 6.

FIG. 6 illustrates an exploded perspective view of a supporting member, a lead tab, and an electrode assembly of a rechargeable battery according to another embodiment. FIG. 7 illustrates a cross-sectional view of a portion of the rechargeable battery of FIG. 6, taken along an X-Y plane. FIG. 8 illustrates a perspective view of the supporting member of the rechargeable battery of FIG. 6.

Referring to FIG. 6 and FIG. 7, a rechargeable battery 102 according to the present embodiment may include an electrode assembly 10, a case 31 receiving or accommodating the electrode assembly 10, a lead tab 53 electrically connected to the electrode assembly 10, and a supporting member 63 installed or coupled to the lead tab 53.

The rechargeable battery 102 according to the present embodiment may have the same structure as that of the rechargeable battery according to the previous embodiment except for the lead tab 53 and the supporting member 63. Thus, repeated and overlapping descriptions are omitted. In addition, the lead tab and the supporting member may be installed to the sides of the positive electrode terminal and the negative electrode terminal; and the lead tab and the supporting member are of the same structure.

In an implementation, two electrode assemblies 10 may be inserted and installed inside the case 31. The lead tab 53 may be coupled with the positive electrode uncoated region 111 of the electrode assembly 10.

The lead tab 53 may include a connecting unit 531 (having a hole 532 in which a positive electrode terminal 21 may be inserted), a side plate 534 under the connecting unit 531 (the side plate 534 being between a side section of the electrode assembly 10 and the case 31), and a coupling bar 535 (under the side plate 534 and coupled with the positive electrode uncoated region 111 of the electrode assembly 10). Each coupling bar 535 (which may be bent at the side plate 534 and may be disposed parallel to the positive electrode uncoated region 111) may be coupled to the uncoated region 111 of each positive electrode assembly 10 through, e.g., welding.

In an implementation, two coupling bars 535 may be inserted between the positive electrode uncoated regions 111; and the coupling bar 535 may be coupled at a surface thereof facing the positive electrode uncoated region 111 through welding. Each coupling bar 535 may have the same structure; and the coupling bar 535 may include a welding portion 535a (bent at a side end of the side plate 534 and coupled to the positive electrode uncoated region 111 by welding), a hook portion 535b (curved or bent from the welding portion 535a toward the outside of the electrode assembly 10), and an insertion tip 535c at an end of the hook portion 535b.

In an implementation, the hook portion 535b may protrude obliquely, e.g., at an angle of about 5° to less than about 90° with respect to the welding portion 535a, toward an adjacent coupling bar 535. The insertion tip 535c may be continuously formed at an end of the hook portion 535b and may extend toward a bottom of the case 31 and may be separated from the positive electrode uncoated region 111. Accordingly, an interval between two facing insertion tips 535c may be smaller than an interval between corresponding facing welding portions 535a. For example, the insertion tip 535c may be positioned at a more inner side than a boundary between the electrode assemblies 10 and the facing insertion tips 535c may not contact one another.

As described above, according to the present embodiment, the hook portion 535b may be formed such that the lead tab 53 may be further easily inserted between the electrode assemblies 10.

The supporting member 63 may be positioned between the lead tab 53 and the inner surface of the case 31 to support the lead tab 53 and the electrode assembly 10, thereby preventing undesirable movement and transformation.

As shown in FIG. 8, the supporting member 63 may include a plate-shaped base 632, supporting protrusions 635 and 638 (protruding from the base 632 toward the electrode assembly 10), and a side end supporting plate 636 (protruding at side ends of the base 632).

The base 632 may have a plate shape that is continuous in a deposition direction of the electrode assembly 10. The base 632 may include a hole 633 therein to discharge gas from the inside of the electrode assembly 10.

The rolled and deposited positive electrode uncoated region 111 may be closely adhered to itself. Thus, an inclined portion 111a may be formed at a portion of the uncoated region 111 contacting the coated region. The side end supporting plate 636 may include an inclined surface 636a in contact with the inclined portion 111a. Thus, the side end supporting plate 636 may stably support the electrode assembly 10 and the lead tab 53 at the inclined portion 111a.

The supporting protrusions 635 and 638 may have a bar shape that protrudes toward the electrode assembly 10. The supporting protrusions 635 and 638 may have supporting jaws 635a and 638a protruding laterally therefrom. The supporting protrusion 635 may protrude at an upper portion of the base 632; and the supporting protrusion 638 may protrude at a lower portion of the base 632. An inclined surface may be formed at an end of the supporting jaw 635a and 638a to be in contact with and support the inclined portion 111a of the positive electrode uncoated region 111.

In an implementation, e.g., two supporting protrusions 635 may be formed at the upper portion of the base 632 and two supporting protrusions 638 may be formed at the lower portion of the base 612, as shown in FIG. 7. Thus, the two supporting protrusions 635 and 638 may be inserted between the welding portions 535a. The upper supporting protrusion 635 may be close to the welding portion 535a such that the supporting jaw 635a may be caught at the width direction end of or extend around the welding portion, e.g., the supporting jaw 635a may grip the welding portion 535a. For example, one end (in a width direction) of the coupling bar 535 may contact the base 632 and another end thereof may contact the supporting jaw 635a such that the supporting member 63 may stably support the lead tab 53.

The upper supporting protrusion 635 may be caught by or extend around the hook portion 535b to downwardly support the lead tab 53. The upper portion of the lead tab 53 may be fixed to the positive electrode terminal 21, thus being relatively strong against an impact. However, the lower portion of the lead tab 53 may be free, thus being relatively weak against an impact. In the present embodiment, if the supporting member 63 is installed under the lead tab 53, the lead tab 53 may be further stably supported.

As described above, the base 632 may be supported by the inner surface of the case 31, and the supporting protrusions 635 and 638 and the side end supporting plate 636 may be supported by the inclined portion 111a such that one supporting member 63 may stably support both the lead tab 53 and the electrode assemblies 10.

Figure 9:
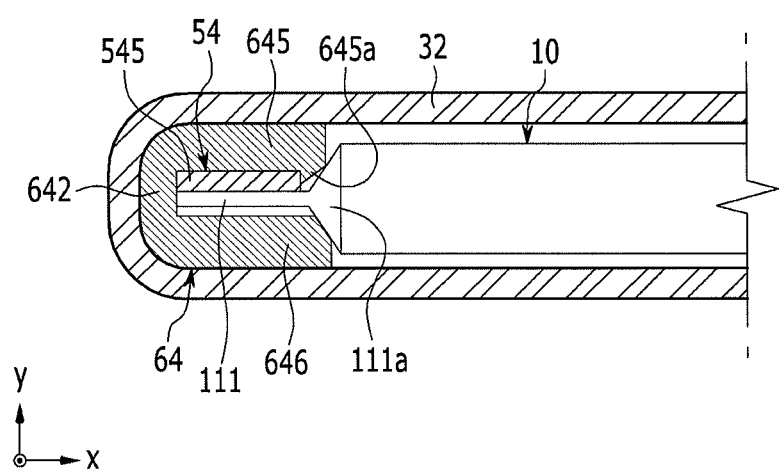
FIG. 9 illustrates a transverse cross-sectional view of a rechargeable battery according to yet another embodiment.

FIG. 9 illustrates a cross-sectional view of a portion of a rechargeable battery according to yet another embodiment.

Referring to FIG. 9, the rechargeable battery 103 according to the present embodiment may include an electrode assembly 10, a case 32 receiving or accommodating the electrode assembly 10, a lead tab 54 electrically connected to the electrode assembly 10, and a supporting member 64 coupled with the lead tab 54.

The rechargeable battery 103 according to the present embodiment has the same structure as that of the rechargeable battery according to the previous embodiments except for the lead tab 54 and the supporting member 64. Thus, repeated and overlapping descriptions are omitted.

One electrode assembly 10 may be inserted and installed inside the case 32. The lead tab 54 may be fixed and installed to a positive electrode uncoated region 111 of the electrode assembly 10.

The lead tab 54 may include a connecting unit (with the positive electrode terminal 21 inserted therein), a side plate (under the connecting unit and between a side section of the electrode assembly 10 and the case 32), and a coupling bar 545 (under the side plate and coupled with the positive electrode uncoated region 111 of the electrode assembly 10). In an implementation, the lead tab 54 may have one coupling bar 545.

The supporting member 64 may include a plate-shaped base 642 and side end supporting plates 645 and 646 protruding from side ends of the base 642.

One side end supporting plate 646 may have an inclined surface that is in contact with an inclined portion 111a of the positive electrode uncoated region 111. Another side end supporting plate 645 may have a supporting jaw 645a protruding laterally therefrom. The side end supporting plate 645 may be close to the lead tab 54 such that the supporting jaw 645a may be caught at the width direction end of or extend around the coupling bar 545, e.g., the supporting jaw 645a may grip the coupling bar 545. One width direction end of the coupling bar 545 may contact the base 642 and another end thereof may contact the supporting jaw 645a such that the supporting member 64 may stably support the lead tab 54. Also, the supporting jaw 645a may contact the inclined portion 111a.

Accordingly, the supporting jaw 645a may support the lead tab 54, the base 642 may be supported by the inner surface of the case 32, and the inclined surface and the supporting jaw 645a may support the inclined portion 111a such that the lead tab 54 and the electrode assembly 10 are stably supported by one supporting member 64.

Figure 10:
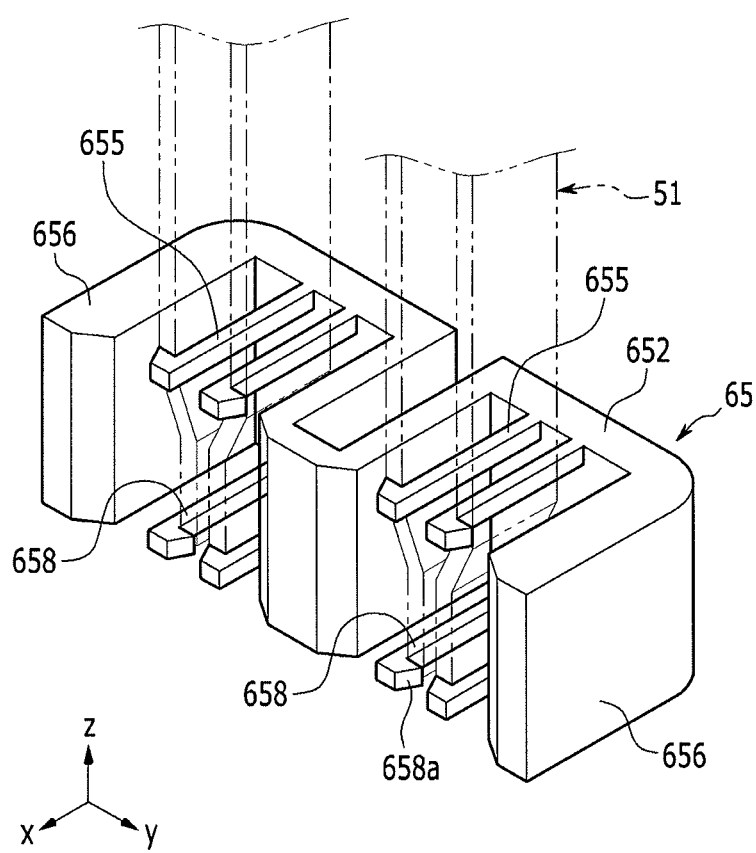
FIG. 10 illustrates a perspective view of a supporting member of a rechargeable battery according to still another embodiment.

FIG. 10 illustrates a perspective view of a supporting member of a rechargeable battery according to still another embodiment.

Referring to FIG. 10, the present embodiment has the same structure as that of the rechargeable battery of the previous embodiments except for the supporting member. Thus, repeated and overlapping descriptions are omitted.

A supporting member 65 may include a plate-shaped base 652, supporting protrusions 655 and 658 protruding from the base 652 toward the electrode assembly 10, and a side end supporting plate 656 protruding from side ends of the base 652.

The base 652 may have plate shape and may be continuous in a deposition direction of the electrode assembly 10. The base 652 may include a hole therein to discharge gas inside the electrode assembly 10.

The side end supporting plate 656 may have an inclined surface 656a in contact with an inclined portion 111a of the positive electrode uncoated region 111. Thus, the side end supporting plate 656 may stably support the electrode assembly 10 and the lead tab 51 at the inclined portion 111a.

The supporting protrusions 655 and 658 may include an upper supporting protrusion 655 protruding from the base 652 and a lower supporting protrusion 658 under the upper supporting protrusion 655. The upper supporting protrusion 655 and the lower supporting protrusion 658 may face opposite surfaces of the coupling bar 515. For example, the upper supporting protrusion 655 may contact an inner surface of the coupling bar 515; and the lower supporting protrusion 658 may contact an outer surface of the coupling bar 515.

The upper supporting protrusion 655 may have a bar shape protruding toward the electrode assembly 10. The upper supporting protrusion 655 may include a supporting jaw 655a at an end thereof and protruding laterally toward an outside thereof. The upper supporting protrusion 655 may be inserted between and may support a welding portion 515a of the lead tab 51.

In an implementation, e.g., two upper supporting protrusions 655 may protrude from an upper end of the base 652. An end of the supporting jaw 655a may include an inclined surface in contact with and supporting the inclined portion of the positive electrode uncoated region. In addition, the upper supporting protrusion 655 may be caught by or may extend around the hook portion 515b that is positioned thereunder, thereby providing downward support.

The lower supporting protrusion 658 may have a bar shape that protrudes toward the electrode assembly 10. The lower supporting protrusion 658 may include a supporting jaw 658a at one end thereof that faces the electrode assembly 10. The lower supporting protrusion 658 may be positioned outside the insertion tip 515c, thereby supporting the lead tab 51.

Two lower supporting protrusions 658 may protrude from a lower end of the base 652. An end of the supporting jaw 658a may have an inclined surface that is in contact with the inclined portion 111a of the positive electrode uncoated region 111.

The upper supporting protrusion 655 may be close to the welding portion 515a such that the supporting jaw 655a may be caught by the width direction end of or extend around the welding portion 515a. The lower supporting protrusion 658 may be close to the insertion tip 515c such that the supporting jaw 658a may be caught by the width direction end of or may extend around the insertion tip 515c.

One end (in the width direction) of the coupling bar 515 may contact the base 652; and another end may contact the supporting jaws 655a and 658a such that the supporting member 65 may stably support the lead tab 51. Also, the supporting jaws 655a, 658a may be respectively positioned at the upper and the lower portions of the hook portion such that the supporting member 65 may be prevented from being substantially moved in the length direction of the lead tab 51.

If the supporting member 65 were to be moved on the lead tab 51 as a result of an impact, the supporting member 65 may not stably support the lead tab 51. However, according to the present embodiment, substantial movement of the supporting member 65 may be prevented, thereby stably supporting the lead tab 51. In addition, according to the present embodiment, the upper supporting protrusion 655 may support between the coupling bars 515 and the lower supporting protrusion 658 may support outside the coupling bar 515, thereby further stably supporting the lead tab 51.

Figure 11:
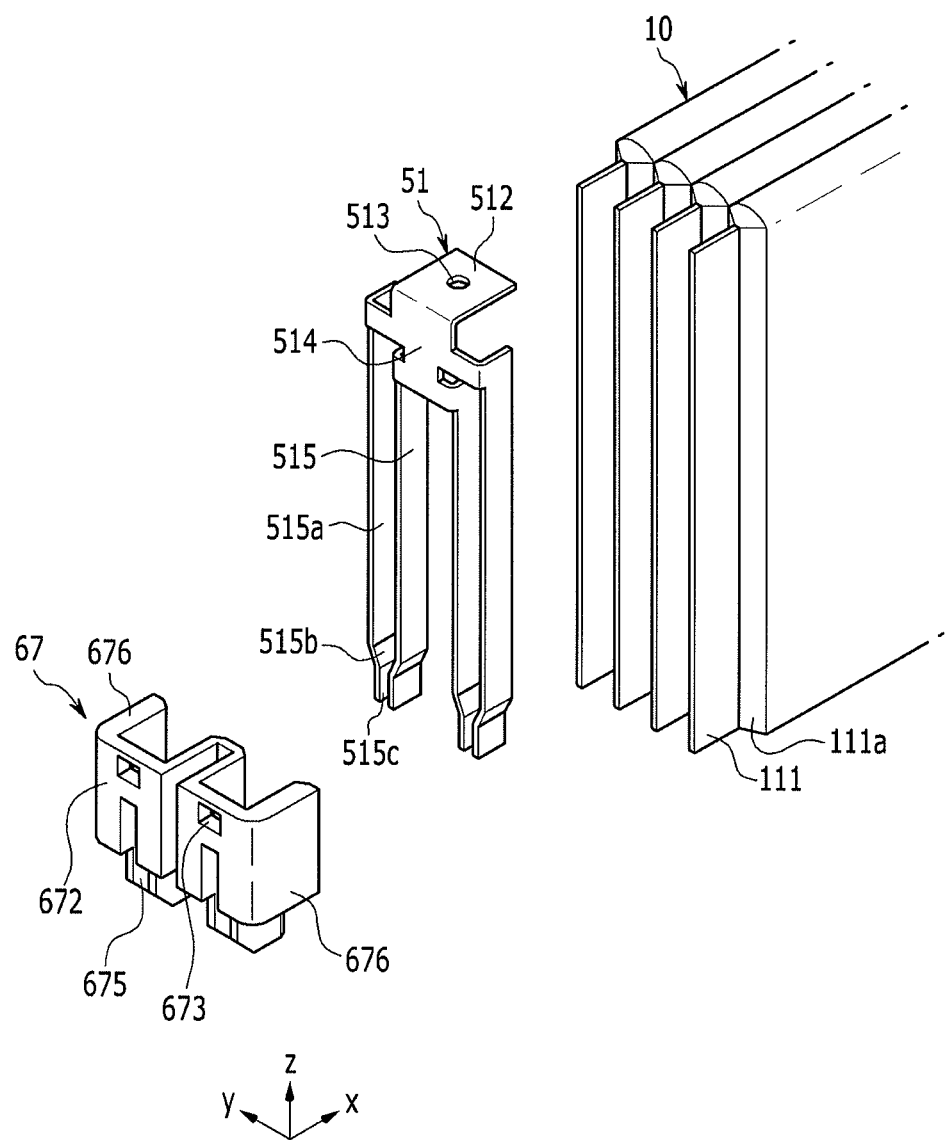
FIG. 11 illustrates an exploded perspective view of a supporting member, a lead tab, and an electrode assembly of a rechargeable battery according to still another embodiment.
Figure 12:
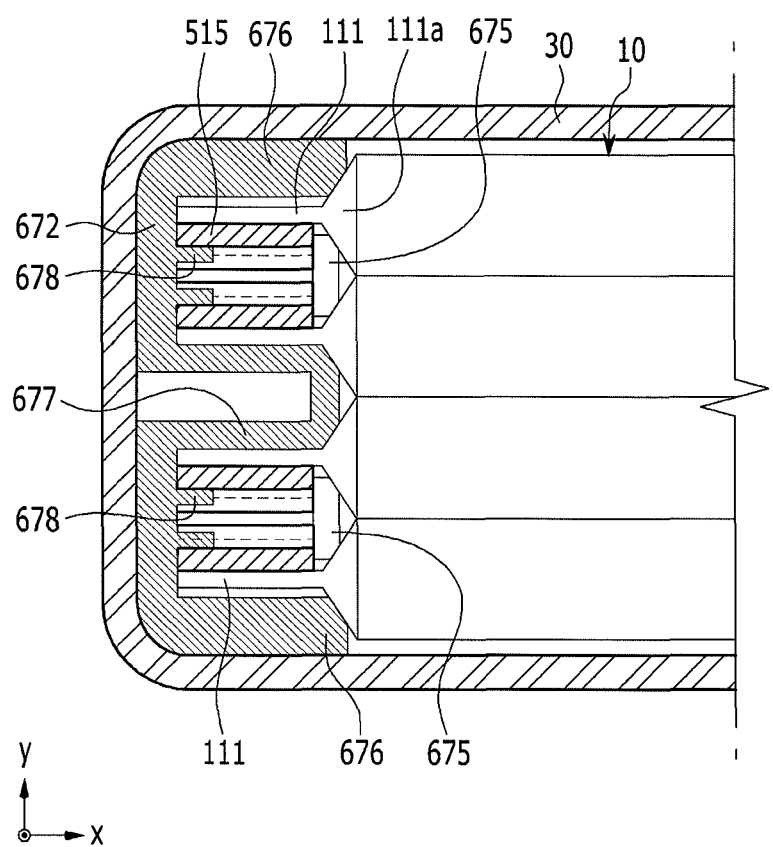
FIG. 12 illustrates a cross-sectional view of a portion of the rechargeable battery of FIG. 11.
Figure 13:
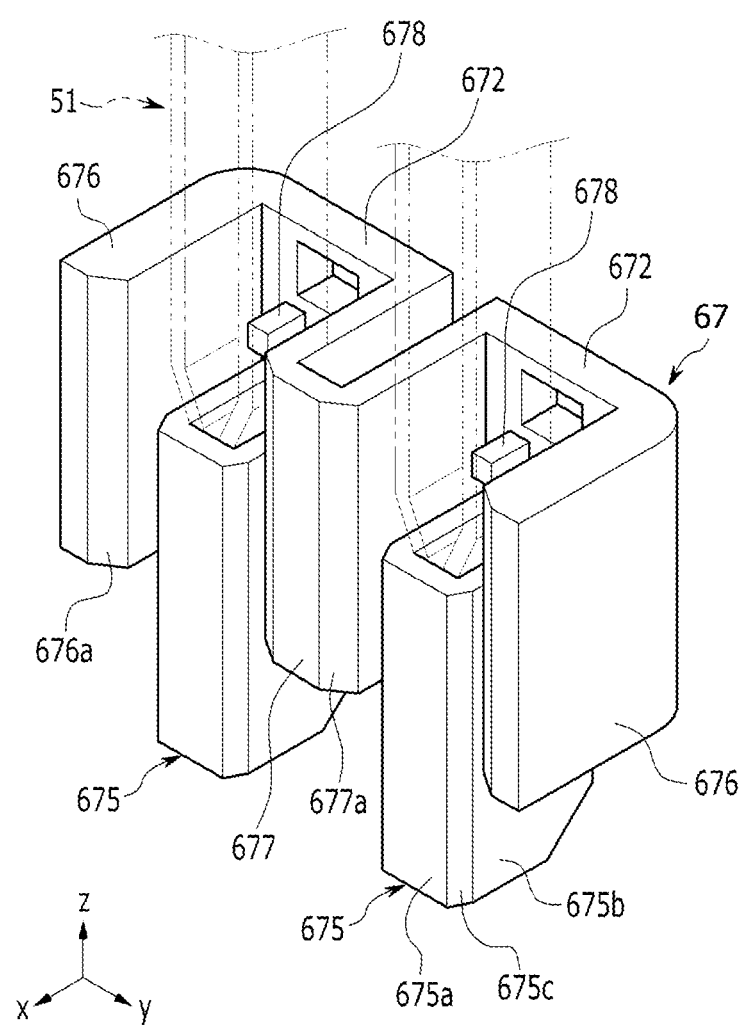
FIG. 13 illustrates a perspective view of the supporting member of the rechargeable battery of FIG. 11.

FIG. 11 illustrates an exploded perspective view of a supporting member, a lead tab, and an electrode assembly of a rechargeable battery according to still another embodiment. FIG. 12 illustrates a cross-sectional view of a portion of the rechargeable battery of FIG. 11. FIG. 13 illustrates a perspective view of the supporting member of the rechargeable battery of FIG. 11.

Referring to FIG. 11 and FIG. 12, a rechargeable battery 104 according to the present embodiment may include an electrode assembly 10, a case 31 receiving or accommodating the electrode assembly 10, a lead tab 51 electrically connected to the electrode assembly 10, and a supporting member 67 installed or coupled to the lead tab 51.

The rechargeable battery 104 according to the present embodiment has the same structure as that of the rechargeable battery according to the previous embodiments except for the supporting member 67.

In an implementation, e.g., four electrode assemblies 10 may be inserted and installed inside the case 30; and the lead tab 51 may be installed or coupled to the positive electrode uncoated region 111 and the negative electrode uncoated region 121 of the electrode assembly 10.

The lead tab 51 may include a connecting unit 512 (having a hole 513 into which the positive electrode terminal 21 is inserted), a side plate 514 under the connecting unit 512 and between a side section of the electrode assembly 10 and the case 30, and coupling bars 515 under the side plate 514 and adhered or coupled to the positive electrode uncoated region 111 of the electrode assembly 10. In the state in which four coupling bars 515 are bent at the side plate 514 and disposed parallel to the positive electrode uncoated region 111, the coupling bars 515 may be coupled to the positive electrode uncoated region 111 of each electrode assembly 10 through welding.

The supporting member 67 may be positioned between the lead tab 51 and an inner surface of the case 30 to support the lead tab 51 and the electrode assembly 10, thereby preventing movement and transformation.

As shown in FIG. 13, the supporting member 67 may include a supporting protrusion 678 protruding from a plate-shaped base 672 toward the electrode assembly 10 as well as a side end supporting plate 676 protruding from side ends of the base 672.

The base 672 may have a plate shape that is continuous in a deposition direction of the electrode assembly 10. A protrusion unit 677 that extends toward the electrode assembly 10 may be formed at a center of the base 672. Also, the base 672 may include a hole 673 therein to discharge gas inside the electrode assembly 10.

The side end supporting plate 676 and the protrusion unit 677 may include inclined surfaces 676a and 677a in contact with the inclined portion 111a of the electrode assembly 10. Thus, the side end supporting plate 676 and the protrusion unit 677 may stably support the electrode assembly 10 and the lead tab 51 at the inclined portion 111a.

The supporting protrusion 678 may protrude toward the electrode assembly 10 under the hole 673. In an implementation, two supporting protrusions 678 may be formed at each side of the protrusion unit 677. Thus, the two supporting protrusion 678 may be inserted between the neighboring welding portions 515a and may be caught by a hook portion 515b that is positioned thereunder to provide downward support.

A supporting jaw 675 enclosing two neighboring insertion tips 515c may be formed under the supporting protrusion 678.

Thus, two supporting jaws 675 may be formed with the protrusion unit 677 interposed therebetween.

The supporting jaw 675 may include a connecting plate 675a (connecting two opposing plates 675b) and an inclined surface 675c at an edge of the connecting plate 675b (in contact with the inclined portion 111a). In addition, an inner surface of the connecting plate 675a may contact the lead tab 51. The opposing plate 675b may be inserted between the insertion tip 515c and the uncoated region 111, thereby enclosing and supporting the lead tab 51 outside the lead tab 51.

Accordingly, the supporting jaw 675 may stably support the lead tab 51 in an inner direction of the rechargeable battery. In addition, the supporting jaw 675 may be positioned under the hook portion 515b such that the supporting member 67 may be prevented from being moved upwardly; and the supporting protrusion 678 may be positioned on the hook portion 515b such that the supporting member 67 may be prevented from being moved downwardly.

Figure 14:
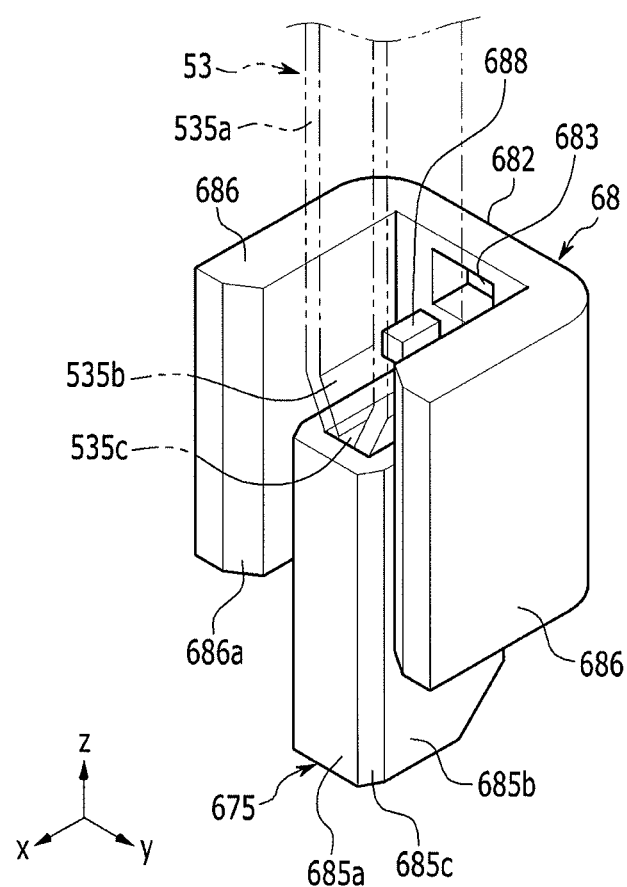
FIG. 14 illustrates a cross-sectional view of a portion of a rechargeable battery according to still another embodiment.
Figure 15:
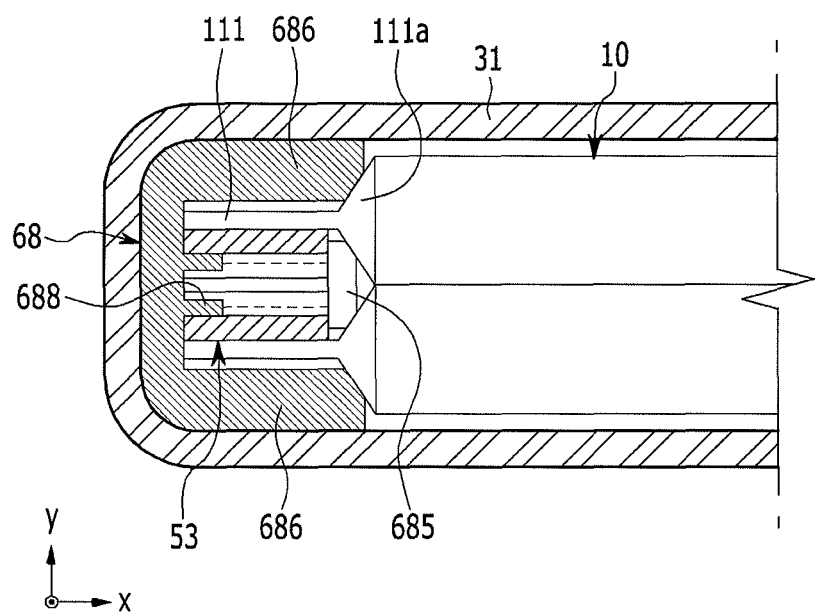
FIG. 15 illustrates a cross-sectional view of a portion of the rechargeable battery of FIG. 14.

FIG. 14 illustrates a cross-sectional view of a portion of a rechargeable battery according to still another embodiment. FIG. 15 illustrates a cross-sectional view of a portion of the rechargeable battery of FIG. 14.

Referring to FIG. 14 and FIG. 15, a rechargeable battery 105 according to the present embodiment may include an electrode assembly 10, a case 31 receiving the electrode assembly 10, a lead tab 53 electrically connected to the electrode assembly 10, and a supporting member 68 installed to the lead tab 53.

The rechargeable battery 104 according to the present embodiment may have the same structure as that of the rechargeable battery according to the previous embodiments, except for the configuration of the supporting member 68. Thus, repeated and overlapping descriptions are omitted.

In an implementation, two electrode assemblies 10 may be inserted and installed in the case 31; and the positive electrode uncoated region 111 of the electrode assembly 10 and the negative electrode uncoated region 121 may be coupled with the lead tab 53.

The supporting member 68 may be positioned between the lead tab 53 and an inner surface of the case 31 to support the lead tab 51 and the electrode assembly 10, thereby preventing movement and transformation.

The supporting member 68 may include a supporting protrusion 688 protruding toward the electrode assembly 10 between a plate-shaped base 682 and a side end supporting plate 686 protruding at side ends of the base 682.

The base 682 may have a plate shape continuous in a deposition direction of the electrode assembly 10. Also, the base 682 may include a hole 683 therein to discharge gas inside the electrode assembly 10.

The side end supporting plate 686 may have an inclined surface 686a in contact with the inclined portion 111a. Thus, the side end supporting plate 686 may stably support the electrode assembly 10 and the lead tab 53 at the inclined portion 111a.

Two supporting protrusions 688 protruding toward the electrode assembly 10 may be under the hole 683, thereby being inserted between welding portions 535a adjacent to two supporting protrusions 688 such that two supporting protrusions 688 may be caught by the hook portion 535b to provide downward support.

A supporting jaw 675 enclosing two neighboring insertion tips 535c may be formed under the supporting protrusion 688. The supporting jaw 685 may include two opposing plates 685b and a connecting plate 685a (connecting the opposing plates 685b), an inclined surface 685c may be formed at the end of the supporting jaw 685 and may contact the inclined portion 111a, and the inner surface of the connecting plate 685b may contact the lead tab 53. Accordingly, the supporting unit 685 may stably support the lead tab 53 in an inner direction of the rechargeable battery.

In addition, the supporting jaw 685 may be positioned under the hook portion 535b such that the supporting member 67 may be prevented from being moved upwardly. The supporting protrusion 678 may be positioned on the hook portion 535b such that the supporting member 67 may be prevented from being moved downwardly.

Figure 16:
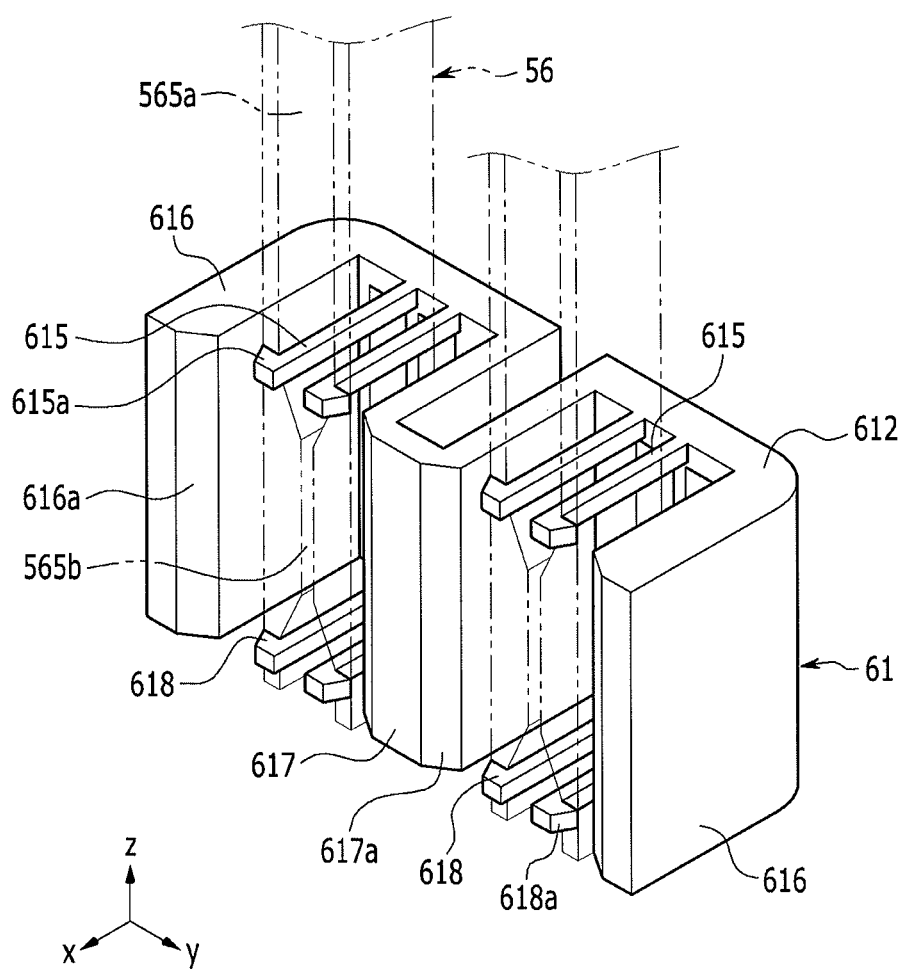
FIG. 16 illustrates a perspective view of a supporting member and a lead tab of a rechargeable battery according to still another embodiment.

FIG. 16 illustrates a perspective view of a supporting member and a lead tab according to still another embodiment. The rechargeable battery according to the present embodiment has the same structure as that of the rechargeable battery according to the previous embodiments except for the structure of a lead tab 56. Thus, repeated and overlapping descriptions are omitted.

A lead tab 56 according to the present embodiment may include a coupling bar 565 attached to the positive electrode uncoated region. The coupling bar 565 may include a hook portion 565b with a protrusion shape that protrudes toward the coupling bar 565 neighboring the welding portion 565a of the bar shape in a welding portion 565a.

A supporting protrusion 615 may be positioned at an upper portion of the hook portion 565b; and a supporting protrusion 618 may be positioned at a lower portion of the hook portion 565b. Accordingly, the supporting protrusions 615 and 618 may support the hook portion 565b such that the supporting member 61 may be prevented from being moved in the up and down directions of the lead tab 56.

By way of summation and review, in general, due to an external vibration or impact, contact between a lead tab and an electrode assembly and contact between the lead tab and a terminal may be deteriorated. If the contact between the lead tab and the terminal or the electrode assembly is bad, not only may the output be deteriorated, but resistance heat may also be generated in the contact. If the heat is substantially generated inside the case, the electrolyte solution may be dissolved and negative reactions may be generated such that the battery may explode or combust.

Accordingly, the embodiments provide a rechargeable battery having a structure that protects an electrode assembly and a lead tab.

In particular, the embodiments provide a rechargeable battery having a supported electrode assembly and lead tab to improve durability against vibration and impact.

According to the embodiments, the supporting member may be installed such that the electrode assembly and the lead tab are prevented from being transformed and vibrated by external vibration or impact.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
    at least one electrode assembly that performs charging and discharging;
    a case receiving the electrode assembly;
    a cap assembly coupled to the case and including at least one terminal electrically connected to the electrode assembly;
    a lead tab electrically connecting the terminal and the electrode assembly; and
    a supporting member between the lead tab and the case, wherein:
    the lead tab includes at least one coupling bar attached to the electrode assembly,
    the supporting member includes a supporting protrusion coupled to one surface of the coupling bar and a base supported by an inner surface of the case,
    the coupling bar includes a welding portion welded to an uncoated region of the electrode assembly,
    the coupling bar includes a protruding hook portion, the hook portion being bent to protrude obliquely with respect to a plane of the welding portion,
    the coupling bar includes an insertion tip on the hook portion such that the hook portion is between the insertion tip and the welding portion, the insertion tip being separated from the uncoated region of the electrode assembly and being parallel with the welding portion,
    the at least one electrode assembly includes a plurality of electrode assemblies, and
    the insertion tip of the coupling bar extends between adjacent uncoated regions of the plurality of electrode assemblies.

2. The rechargeable battery as claimed in claim 1, wherein the supporting member further includes a supporting jaw, the supporting jaw extending around one surface of the coupling bar.

3. The rechargeable battery as claimed in claim 2, wherein:
    the rechargeable battery includes a plurality of electrode assemblies,
    the lead tab includes a plurality of coupling bars attached to each electrode assembly,
    the supporting member includes a plurality of supporting protrusions, and
    the supporting jaw protrudes from the supporting protrusion.

4. The rechargeable battery as claimed in claim 1, wherein:
    the supporting member includes a side end supporting plate protruding from side ends of the base, and
    the side end supporting plate supports the uncoated region of the electrode assembly and the inner surface of the case.

5. The rechargeable battery as claimed in claim 4, wherein the side end supporting plate includes a supporting jaw at an end thereof, the supporting jaw extending around one surface of the coupling bar.

6. The rechargeable battery as claimed in claim 1, wherein the supporting protrusion is positioned on the hook portion.

7. The rechargeable battery as claimed in claim 1, wherein:
    the supporting protrusion includes an upper supporting protrusion and a lower supporting protrusion vertically separated from the upper supporting protrusion, and
    the hook portion is positioned between the upper supporting protrusion and the lower supporting protrusion.

8. The rechargeable battery as claimed in claim 7, wherein:
    the supporting protrusions include a supporting jaw protruding laterally at a side thereof, the supporting jaw extending around one surface of the coupling bar, and
    the supporting jaw of the upper supporting protrusion and the supporting jaw of the lower supporting protrusion protrude in different lateral directions.

9. The rechargeable battery as claimed in claim 8, wherein the upper supporting protrusion and the lower supporting protrusion contact opposite surfaces of the coupling bar.

10. The rechargeable battery as claimed in claim 1, wherein the supporting member further includes a supporting jaw enclosing the coupling bar.

11. The rechargeable battery as claimed in claim 10, wherein:
    the supporting jaw is under the supporting protrusion, and
    the hook portion is between the supporting protrusion and the supporting jaw.

12. The rechargeable battery as claimed in claim 10, wherein:
    the electrode assembly includes a plurality of electrode assemblies,
    the lead tab includes a plurality of coupling bars attached to the electrode assemblies, and
    the supporting jaw encloses the plurality of coupling bars and includes opposing plates and a connecting plate fixed to an end of the opposing plates.

13. The rechargeable battery as claimed in claim 12, wherein:
    the supporting protrusion is inserted between neighboring welding portions, and
    at least one of the opposing plates is inserted between the insertion tip and the uncoated region of the electrode assemblies.

14. The rechargeable battery as claimed in claim 1, wherein:
    the electrode assembly includes a plurality of electrode assemblies, and
    the base includes a protrusion unit that is bent and is inserted between uncoated regions of the electrode assemblies.

15. The rechargeable battery as claimed in claim 1, wherein the base includes a hole to discharge gas inside the electrode assembly.

16. The rechargeable battery as claimed in claim 1, wherein the hook portion extends from the welding portion at an angle of about 5 degrees to less than 90 degrees, relative to the plane of the welding portion.

17. The rechargeable battery as claimed in claim 1, wherein a plane containing the insertion tip of the coupling bar is parallel with the plane containing the welding portion.

* * * * *